(No Model.)  J. BENDIX.  2 Sheets—Sheet 1.
PROCESS OF AND APPARATUS FOR PURIFYING ALCOHOL.
No. 287,089. Patented Oct. 23, 1883.
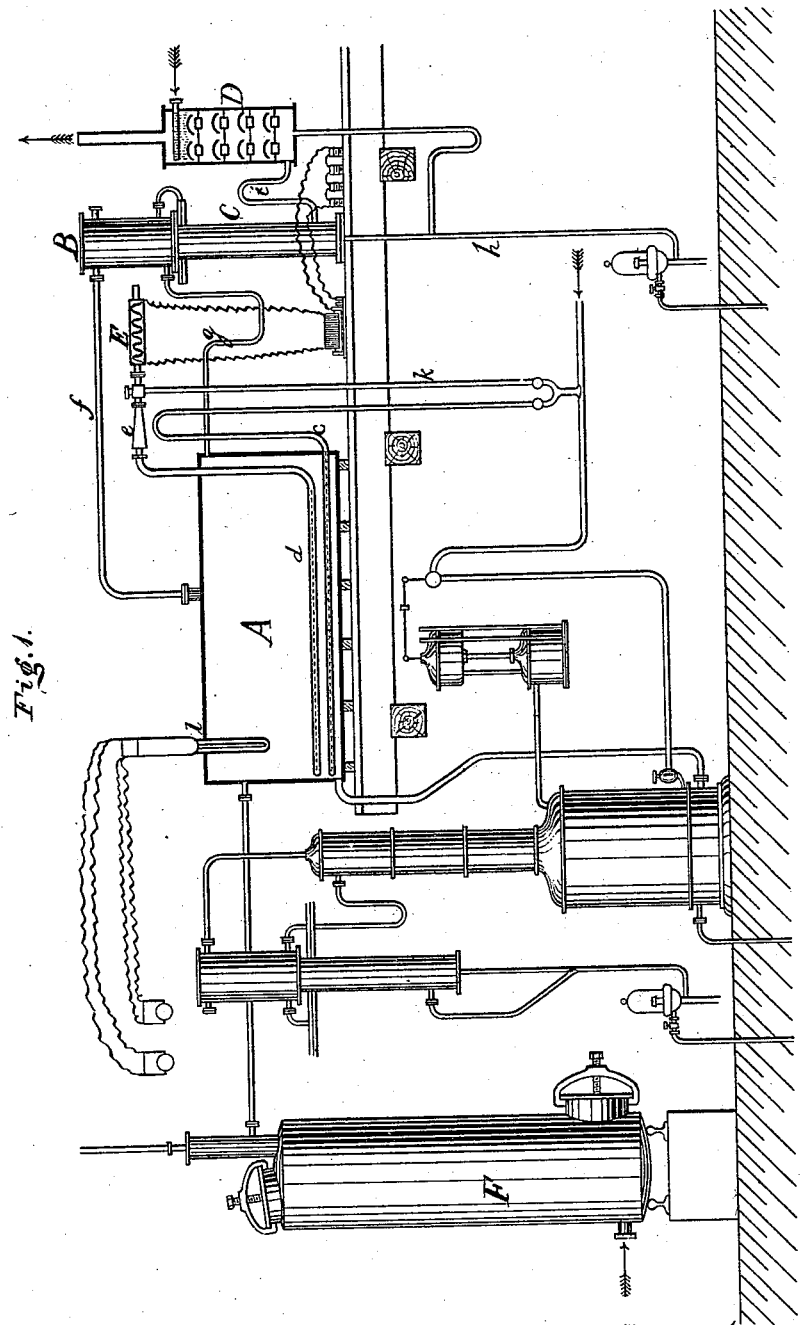

(No Model.) 2 Sheets—Sheet 2.
J. BENDIX.
PROCESS OF AND APPARATUS FOR PURIFYING ALCOHOL.
No. 287,089. Patented Oct. 23, 1883.
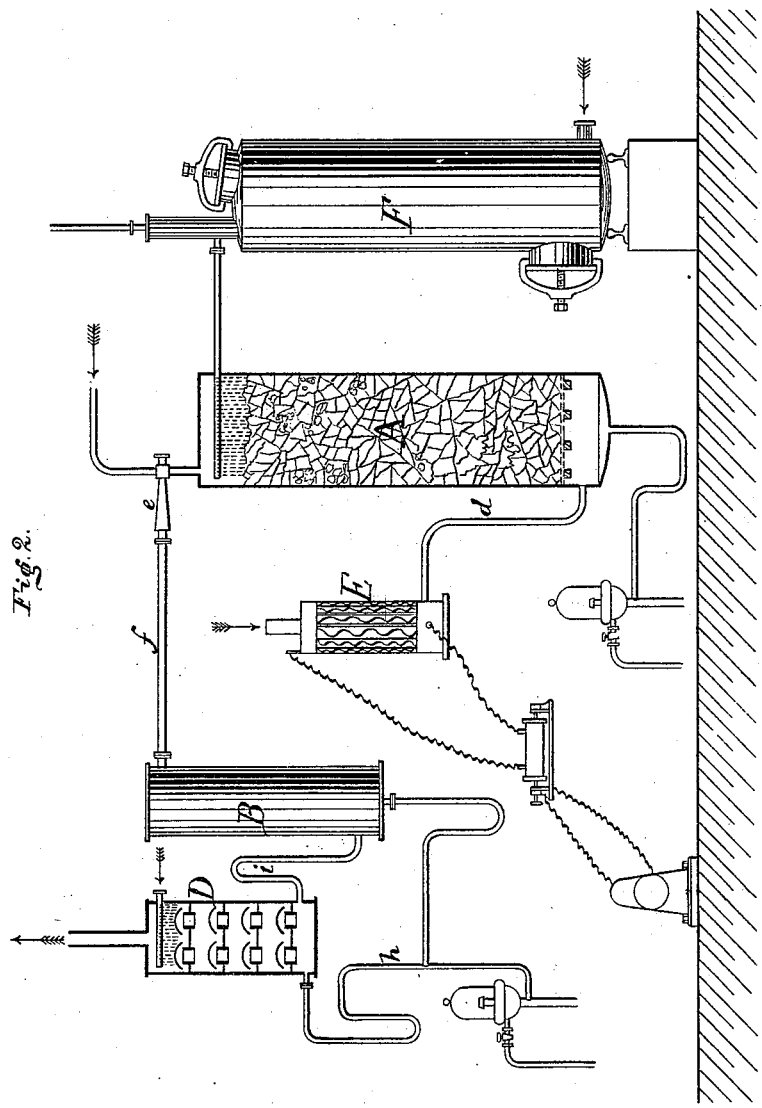
Witnesses:
John C. Tunbridge,
John M. Speer.
Inventor:
Josef Bendix
by his attorneys
Briesen & Steele

UNITED STATES PATENT OFFICE.

JOSEF BENDIX, OF BERLIN, GERMANY, ASSIGNOR TO RAPHAEL EISENMANN, OF SAME PLACE.

PROCESS OF AND APPARATUS FOR PURIFYING ALCOHOL.

SPECIFICATION forming part of Letters Patent No. 287,089, dated October 23, 1883.

Application filed June 14, 1883. (No model.)

*To all whom it may concern:*

Be it known that I, JOSEF BENDIX, of Berlin, Prussia, Germany, have invented new and useful Improvements in the Process of and Apparatus for Purifying Alcohol, of which the following is a specification.

The invention consists in the purification of alcohol by subjecting it, prior to its treatment in the still, to the influence of ozone generated by electricity and to an electric current in a suitably-constructed apparatus. The filtering-vessels usually employed are, according to the invention, filled with porous or spongy metal, preferably iron, either as sponge-iron resulting from the treatment of the ore in reduction or smelting furnaces, or as iron shavings obtained by planing or turning iron, or in any other way. The metal in a porous state, coming into contact with the alcohol, first precipitates the impurities mechanically. Further, it acts as an electro-positive and strongly-reducing agent upon the detrimental by-products of the fermentation. This latter action is intensified by increasing the electro-positive condition of the iron, either by connecting it with the negative pole of a galvanic battery or by constructing the filter itself as if it were the source of electricity, placing an electro-negative metal opposite to the electro-positive iron. This effect may be produced by adding pieces of electro-negative metals to the iron or by depositing a metallic coat upon it. For example, for coating the iron with copper, sulphate of copper is poured over it. This electric agitation can likewise be effected by non-metallic elements which are in electric opposition to the iron. Red oxide of manganese or other manganese salts are serviceable. The metal should always be in a porous state, while the combination itself may be produced either by mixing or by galvanic deposition. The great advantage of this new mode of filtration over the old one consists in the fact that the alcohol need not be diluted fifty per cent., because the new process acts most energetically. The further purification of the alcohol by ozone, either when it has passed the old charcoal filter or the new one above described, is effected by means of the apparatus shown in the drawings which form part of this specification, and in the following manner:

Figure 1 represents a plant for periodical working, and Fig. 2 represents such a one for continuous working.

In the first case the alcohol strained through the filter F, filled with charcoal or, as above described, with porous metal, flows into the tank A, where it is purified by ozonized air forced from the ozonizer E by means of the injector $e$. The latter is operated by steam through the steam-pipe $k$. The ozonized air is forced into the alcohol through the perforated pipe $d$ near the bottom of the tank A, while the alcohol is heated, by steam introduced through the perforated steam-pipe $c$, to a temperature very near the boiling-point of alcohol.

In order to control the temperature, an electric thermometer, $l$, is made use of. The air, after having transferred its ozone to the alcohol, escapes through the pipe $f$ to the condenser B, and thence the alcohol contained in the air which was carried along with it is conveyed back to the tank A through the pipe $g$, having been condensed to a fluid in the condenser B. The more volatile portion is condensed in the cooler C and flows through the pipe $h$ into a reservoir. (Not shown in the drawings.) Those portions which are still in a state of vapor pass through the pipe $i$ into a "Derosne" column, D, and from thence as a fluid into the reservoir above mentioned.

For continuous working, the alcohol strained through the filter F flows to the top of the closed vessel A, Fig. 2, which is filled with broken lumps of coke or stone, or with plates of corrugated sheet metal, for the purpose of presenting a very large surface to the alcohol flowing down. Air ozonized in the ozonizer E is forced through the pipe $d$ under the false bottom of the vessel A, and after having given off the ozone to the alcohol, the air passes through the pipe and into the condenser B, and thence through the pipe $i$ to the Derosne column D, while the fluid alcohol is carried through the pipe $h$ to the reservoir. (Not shown in the drawings.) The heating of the alcohol in the vessel A is dispensed with, as is also the cooler C. In both drawings the air is drawn through the ozonizer E and forced into the vessel A by means of an injector, e; but, if preferred, a pump or any other suitable device may be employed. The ozonization may be effected by a Bunsen battery, as in Fig. 1, or by a magneto-electric machine, as in Fig. 2, or by any other suitable contrivance for producing the slow discharge of electricity under tension. To prevent the formation of hyponitrous acid, it is recommended that the air be passed through a drying apparatus prior to its entrance into the ozonizer. The effect of the ozone (oxygen in an allotropic form) is astonishing. It acts principally upon the impurities in the alcohol which have escaped the action of the filter. It oxidizes part of them into volatile products, which are carried off mechanically by the air-current, and converts a portion into odorless compounds having a high boiling-point, which pass off as vapor during the subsequent distillation.

It is not new with me to pass the alcohol through porous metal, nor to subject such alcohol to electric action, nor to pass ozone through it in the absence of an electric current; but the merit of my invention lies in simultaneously passing the ozone and the electric current through the divided alcohol, thereby obtaining a powerful effect of the electric current on the ozone, rendering the latter far more active, and still allowing the electric current to affect the alcohol in the manner stated.

I claim—

1. The process herein described of purifying alcohol, which consists in passing it over or through a layer of porous metal in the presence of an electric current, and in simultaneously opposing to the current of the alcohol a counter current of ozonized air, as set forth.

2. The combination of the tank A with the filter F, ozonizer E, condenser B, Derosne column D, injector e, and connecting-pipes between said vessels for simultaneous action, substantially as herein shown and described.

This specification signed by me this 29th day of March, 1883.

JOSEF BENDIX.

Witnesses:
   ULR. R. MAERZ,
   CARL T. BURCHARDT.